United States Patent
Bonnel et al.

(10) Patent No.: US 10,922,110 B2
(45) Date of Patent: Feb. 16, 2021

(54) METHOD FOR STORING DATA IN A VIRTUALIZED STORAGE SYSTEM

(71) Applicant: BULL SAS, Les Clayes sous Bois (FR)

(72) Inventors: Thierry Bonnel, Herblay (FR); Florence Vallee, Paris (FR); Christian Dejon, Paris (FR); Patrice Bleuze, Bougival (FR)

(73) Assignee: Bull Sas, Les Clayes-sous-Bois (FR)

( * ) Notice: Subject to any disclaimer, the term of this patent is extended or adjusted under 35 U.S.C. 154(b) by 0 days.

(21) Appl. No.: 15/856,899

(22) Filed: Dec. 28, 2017

(65) Prior Publication Data
US 2018/0181419 A1   Jun. 28, 2018

(30) Foreign Application Priority Data
Dec. 28, 2016 (FR) ...................... 16 63488

(51) Int. Cl.
*G06F 9/44* (2018.01)
*G06F 9/455* (2018.01)
*G06F 9/50* (2006.01)

(52) U.S. Cl.
CPC .......... *G06F 9/45537* (2013.01); *G06F 9/455* (2013.01); *G06F 9/45558* (2013.01); *G06F 9/5077* (2013.01); *G06F 2009/45583* (2013.01)

(58) Field of Classification Search
CPC .................................................. G06F 9/45537
See application file for complete search history.

(56) References Cited

U.S. PATENT DOCUMENTS

| | | | |
|---|---|---|---|
| 8,166,475 B1 | 4/2012 | Scales et al. | |
| 9,135,031 B1 | 9/2015 | Knight | |
| 2005/0281261 A1* | 12/2005 | Zur ...................... | H04L 12/4633 370/389 |
| 2008/0034327 A1* | 2/2008 | Cisler ..................... | G06F 9/451 715/854 |
| 2008/0059144 A1* | 3/2008 | Earhart ............... | G06F 9/45533 703/23 |
| 2008/0059684 A1* | 3/2008 | Haechten ............. | H04Q 3/0045 710/312 |
| 2008/0074785 A1* | 3/2008 | Hansen .................. | G11B 5/265 360/128 |
| 2011/0276963 A1 | 11/2011 | Wu et al. | |
| 2012/0192185 A1* | 7/2012 | Ashok ....................... | G06F 8/63 718/1 |
| 2013/0031570 A1* | 1/2013 | Natrajan ............... | G06F 3/0683 719/326 |
| 2013/0055249 A1 | 2/2013 | Vaghani et al. | |
| 2016/0004611 A1 | 1/2016 | Lakshman et al. | |

FOREIGN PATENT DOCUMENTS

EP   2397943 A2   12/2011

OTHER PUBLICATIONS

French Search Report Application No. FR 16 63488 dated Oct. 5, 2017.

* cited by examiner

*Primary Examiner* — Hang Pan
(74) *Attorney, Agent, or Firm* — Von Briesen & Roper, s.c.

(57) ABSTRACT

The invention relates to a method for storing data of an application running on a virtual machine, in a virtualized storage system corresponding to the emulation of at least one magnetic tape and at least one associated magnetic tape drive, via a data exchange protocol which is TCP/IP.

15 Claims, 1 Drawing Sheet

METHOD FOR STORING DATA IN A VIRTUALIZED STORAGE SYSTEM

CROSS-REFERENCE TO RELATED APPLICATION

This application claims priority under the Paris Convention to French Patent Application No. 16 63488 filed on Dec. 28, 2016.

FIELD OF THE DISCLOSURE

The invention relates to the field of storage methods of an application running on a virtual machine managed by a virtualization hypervisor, in a virtualized storage system. The invention also relates to the virtual machines and virtualized storage systems that are associated with these storage methods.

BACKGROUND OF THE DISCLOSURE

The invention relates in particular to the field of storage methods for applications which are of great value to their users and therefore need storage for the long term, but which are often large, complex, and difficult to modernize especially long after their initial design.

It is possible, however, to run these applications without significant changes in a virtualized environment that allows them a long service life and allows them to continue to operate at a very low maintenance cost and complexity.

According to a first prior art, for example described in FIG. 1, a method for storage is known for an application running on a virtual machine managed by a virtualization hypervisor, in a virtualized storage system that is supported by this virtualization hypervisor.

In this first prior art, the application and the virtualized storage system exchange data via a data exchange protocol in a fiber connection ("Fibre Channel) which is particularly well suited for data storage.

On the other hand, when a virtualized storage system is partially supported by the virtualization hypervisor, data exchange in a fiber channel connection remains possible but is degraded and some of the usual functionalities are no longer possible, although some of them may be useful or even necessary for the application in question.

For example, the use of tape drives by an application running on a virtual machine in a virtualized environment is subject to particular constraints that are generally not supported by virtualization hypervisors.

For virtualized storage systems which are generally not supported or at least are not fully supported by virtualization hypervisors, such as tape drives, some solutions are known but they all result in degraded operation due to the loss of common necessary or at least useful functionalities.

According to a second prior art, it is known to be able to establish a link occasionally between a virtual machine and a virtualized storage system in a passthrough mode of operation. This mode of direct connection of a virtual machine to a virtualized storage device bypasses the virtualization hypervisor. Passthrough mode leads to loss of functionality concerning high availability and dynamic backups of stored data; this makes it less attractive and possibly even incompatible for use by critical and secure applications, such as the storage of confidential medical data for users of a health system which must archive and maintain its archive for many years.

In a third potential prior art, using the Internet Small Computer Interface (iSCSI) data exchange protocol could be considered, but the same restrictions on the use of tape drives would apply for some hypervisors.

In a fourth potential prior art, using the Fibre Channel over Ethernet (FCoE) data exchange protocol could be considered, but the same restrictions on the use of tape drives would apply for some hypervisors.

SUMMARY OF THE DISCLOSURE

The object of the present invention is to provide a data storage method which at least partially overcomes the above disadvantages.

More particularly, the invention aims to provide a storage method for an application running on a virtual machine managed by a virtualization hypervisor, in a virtualized storage system which is at least partially unsupported by this virtualization hypervisor, via a data exchange protocol at a higher level, the network level, which is supported by this virtualization hypervisor and is not a data exchange protocol dedicated to data storage.

The invention proposes a data exchange protocol that performs a kind of encapsulation of the virtualized storage device so as to render it transparent for the virtualization hypervisor which, as it no longer sees the (at least partially) incompatible characteristic of the storage device, will accept completely supporting it.

To do so, the invention will create a kind of encapsulation and decapsulation of messages to and from the virtualized storage device before sending them to or receiving them from the virtualization hypervisor, via a data exchange protocol at the network level. The virtualized storage system will have a modified interface for carrying out this encapsulation/decapsulation at the storage level, while the application will also have a modified interface to carry out this encapsulation/decapsulation symmetrically at the application level, which is an elegant way to bypass the (total or at least partial) incompatibility between the virtualization hypervisor and the virtualized storage system.

To this end, the invention proposes a method for storing data of an application running on a virtual machine managed by a virtualization hypervisor, in a virtualized storage system corresponding to the emulation of at least one storage device at least partially unsupported by the virtualization hypervisor, via a network-level data exchange protocol which is not dedicated to data storage and which is supported by the virtualization hypervisor.

To this end, the invention also proposes a virtual machine managed by a virtualization hypervisor, comprising a machine interface coded to send data storage commands from an application running on this virtual machine and to receive responses to these commands from a virtualized storage system corresponding to the emulation of at least one storage device at least partially unsupported by the virtualization hypervisor, via a network-level data exchange protocol which is not dedicated to data storage and which is supported by the virtualization hypervisor.

To this end, the invention also proposes a virtualized storage system corresponding to the emulation of at least one storage device at least partially unsupported by a virtualization hypervisor, comprising a storage interface coded to receive data storage commands from an application running on a virtual machine managed by this virtualization hypervisor and to send responses to these commands, via a network-level data exchange protocol which is not dedicated to data storage and which is supported by this virtualization hypervisor.

In the case where the virtualized storage system is the emulation of at least one magnetic tape and at least one associated magnetic tape drive, the data exchange protocol is TCP/IP (Transport Control Protocol/Internet Protocol). This data exchange protocol TCP/IP is universally known, and is obviously not a protocol dedicated to data storage although it is widely used today in this context.

In this case, the invention proposes a method for storing data of an application running on a virtual machine, in a virtualized storage system corresponding to the emulation of at least one magnetic tape and at least one associated magnetic tape drive, via a data exchange protocol which is TCP/IP.

In this case, the invention also proposes a virtual machine comprising a machine interface coded to send data storage commands from an application running on this virtual machine and to receive responses to these commands from an emulation of at least one magnetic tape and at least one associated magnetic tape drive, via a network-level data exchange protocol which is TCP/IP.

In this case, the invention also proposes a virtualized storage system corresponding to the emulation of at least one magnetic tape and at least one associated magnetic tape drive, not supported by a virtualization hypervisor, comprising a storage interface coded to receive data storage commands from an application running on a virtual machine managed by this virtualization hypervisor and to send responses to these commands, via a network-level data exchange protocol which is TCP/IP.

In this case, in preferred embodiments of the invention, the storage method provides access to data on tapes in a virtualized environment, based on a TCP/IP communication protocol between the application running on a virtual machine and the library of virtual storage tapes. Connection of the virtual tape on a Fibre Channel is only supported by imposing certain usage constraints in some hypervisors. In this virtual environment, the SCSI ("Small Computer Interface") protocol supported by the Fibre Channel communication link is replaced by a TCP/IP protocol located at the network level, in the socket application level. The SCSI commands are encapsulated in IP packets. The TCP/IP protocol then makes it indirectly possible to send and receive SCSI commands and responses which could not have been sent and received directly due to obstruction by the virtualization hypervisor.

According to preferred embodiments, the invention comprises one or more of the following features which can be used separately or in partial combination or in total combination, with one or more of the aforementioned objects of the invention.

Preferably, the use of these storage systems by applications has been programmed in the COBOL language. Their direct adaptation would be complex and expensive. It is simpler and more efficient to virtualize these storage systems which preferably are tapes.

Tapes are sequential access storage, such as conventional magnetic tapes. Some functionalities are specific to such tapes. Each tape must preferably be able to be mounted and unmounted in the storage system. Data access is sequential on each tape. Therefore, the tape should preferably be rewindable, and it should also preferably be able to be positioned at a specific location (by winding forward to that specific location).

Preferably, the emulated storage device comprises the emulation of one or more memories requiring sequential access for reads and writes. This type of memory includes specific features that are often not supported by virtualization hypervisors, thus making the use of the invention particularly attractive.

Preferably, the emulated storage device comprises the emulation of one or more removable memories. Thus, not only can a basic storage device be emulated, but also a library of several or even numerous basic storage devices, possibly identical or similar to each other. It will thus be possible emulate not only a tape for example, but also a library of several or even numerous tapes.

Preferably, the emulated storage device comprises the emulation of at least one magnetic tape and at least one associated magnetic tape drive. This type of memory includes specific functionalities which are often not supported by virtualization hypervisors, thus rendering the use of the invention particularly attractive.

Preferably, the network-level data exchange protocol is TCP/IP. This is a well-known and widely used protocol, is fully compatible with virtualization hypervisors, and can easily and efficiently encapsulate and decapsulate the commands and responses of virtualized storage systems, particularly storage tapes.

Preferably, the TCP/IP communication protocol transports SCSI commands and their responses. SCSI commands and their responses are used in some storage systems, for example storage tapes. A new TCP/IP network protocol is advantageously defined at the socket level in a client-server model. The exchanged messages then simulate sending SCSI commands and receiving their response. The SCSI commands and their responses are advantageously encapsulated in IP packets.

Preferably, the emulated storage device listens for requests from the application or applications at a socket defined by the association of an IP address and a port number. It can thus handle requests from different client applications, but it must process them in their order of arrival. Each emulated drive is accessible via a pairing consisting of an IP address and a port number. Multiple tape drives can be emulated for each IP address. Multiple IP addresses can be configured for a storage server. Exchanges occur over an Ethernet/IP network. A tape drive is described by an <IP><port #> pairing. The virtual tape drive creates a socket-type communication point where it listens for requests from different potential clients. Since a driver is not shareable, it is the first connecting client application that accesses the drive until this client application initiates its termination. The open socket connection is bidirectional. It allows an application to send queries and the associated data, and allows the virtualized storage system to send the responses to queries and the associated data. The protocol is synchronous, the storage system only processing a query after having sent the response to the previous query.

Preferably, the application is a secure critical application requiring dynamic backup. The use of the invention is thus of particular interest because these virtualization hypervisors do not offer any dynamic backup feature, or even when the virtualization hypervisors are sufficiently advanced to provide at least partial support for any virtualized storage system.

Preferably, management of the emulated storage device itself is carried out using a communication protocol which is different from the network-level data exchange protocol and is not dedicated to data storage.

This virtualized storage system provides tape drive emulation that offers a network communication protocol, preferentially TCP/IP, and no longer a Fibre Channel connection. The data path is therefore changed to use the network connection mode. However, the path for commands managing the tape mount and unmount requests remains unchanged because it is independent of the Fibre Channel connection.

Preferably, the virtual machine is based on virtualization of a proprietary operating system. The use of the invention becomes increasingly attractive the more difficult and tricky it is to update and upgrade such a proprietary operating system: it is then necessary to access proprietary information which by definition is less accessible or inaccessible.

Preferably, the virtualization hypervisor is a "VMware" virtualization hypervisor.

Preferably, the engine of the virtualized storage system runs on an "AIX" platform.

Preferably, the virtualized storage system comprises a server associated with a disk array and software for emulating, in the disk space of the disk array, at least one virtual magnetic tape and at least one associated virtual magnetic tape drive, and preferably several virtual magnetic tapes and one or more associated virtual magnetic tape drives. A good compromise is thus achieved between, on the one hand, this old static system of magnetic tapes which it is then no longer necessary to upgrade and enabling the data stored on them to retain their structure, and on the other hand, the new higher performance storage system that can be used without the need to restructure the data in order to be stored there.

The application accesses storage tapes through a virtualized storage system. This virtualized storage system comprises a server, a disk array, and software capable of emulating magnetic storage tapes in this disk space. In this virtualized environment of the application, the storage system is modified at its interface in order to adapt to the new network communication protocol.

Preferably, the virtual tape drive is an "HP LTO5" drive. In fact, the virtualized storage system emulates "HP LTO5" tape drives, which are the drives supported by certain existing applications of high volume.

Other features and advantages of the invention will be apparent from reading the following description of a preferred embodiment of the invention, given by way of example and with reference to the accompanying drawings.

DETAILED DESCRIPTION OF THE DISCLOSURE

Figure 1:
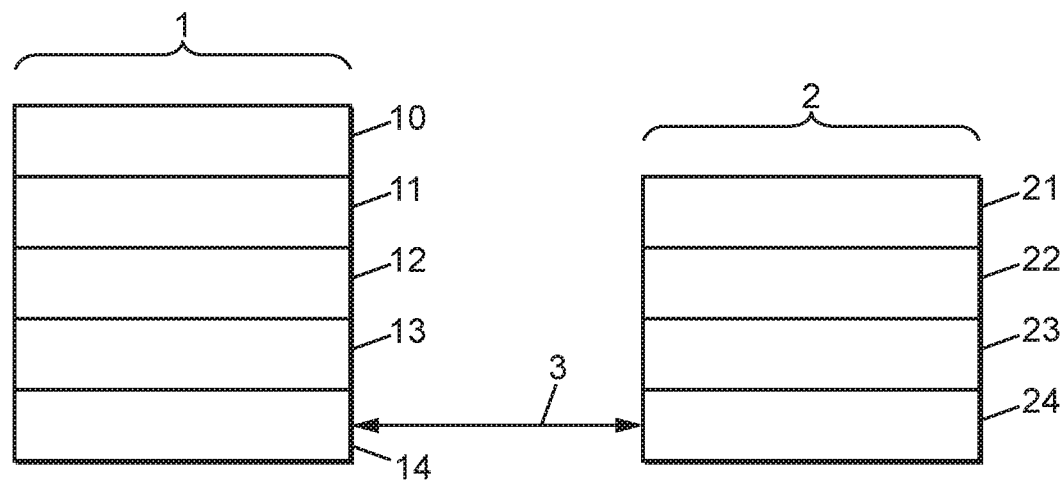
FIG. 1 schematically represents an exemplary storage method for an application running on a virtual machine managed by a virtualization hypervisor, in a virtualized storage system that is supported by this virtualization hypervisor, according to the prior art.

FIG. 1 schematically represents an exemplary storage method for an application running on a virtual machine managed by a virtualization hypervisor, in a virtualized storage system that is supported by this virtualization hypervisor, according to an embodiment of the prior art.

The computer system comprises an application part 1 and a storage part 2 which communicate on a communication connection 3. The application part 1 comprises a stack of several layers 10 to 14: layer 13 (for example "Windows Api Tape") being above layer 14 (for example "Driver Emulex Lpe 16002"), layer 12 (for example "Api Tape") being above layer 13, layer 11 (for example "V7000 DilTape") being above layer 12, layer 10 (for example "GCOS7") being above layer 11.

The storage part 2 comprises a stack of several layers 21 to 24: layer 23 (for example "AIX") being above layer 24 (for example "Target Driver"), layer 22 (for example managing the SCSI commands) being above layer 23, layer 21 (for example "Virtuo engine") being above layer 22. Layer 14 of the application part 1 communicates with layer 24 of the storage part 2 by connection 3. Connection 3 is a Fibre Channel connection carrying SCSI commands and responses.

For example, one or more applications 1 accesses tape drives 2 via a Fibre Channel connection 3, enabling a high throughput connection between the computer hosting the application 1 and the storage system 2. The connection 3 carries the SCSI protocol which describes the mechanical, electrical, and functional specifications of the bus connecting a computer to peripherals.

Figure 2:
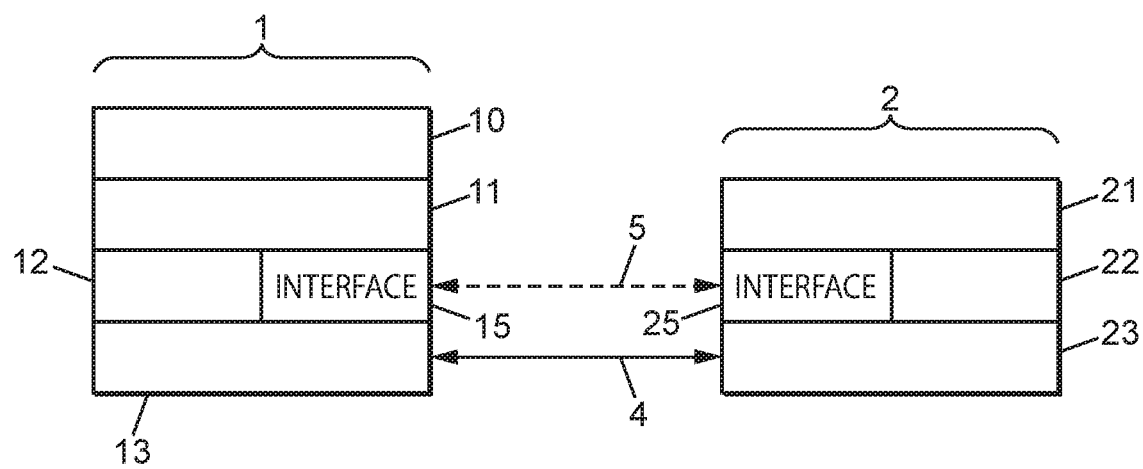
FIG. 2 schematically represents an exemplary storage method for an application running on a virtual machine managed by a virtualization hypervisor, in a virtualized storage system that is not supported by this virtualization hypervisor, according to an embodiment of the invention.

FIG. 2 schematically represents an exemplary storage method for an application running on a virtual machine managed by a virtualization hypervisor, in a virtualized storage system that is not supported by this virtualization hypervisor, according to an embodiment of the invention. In the virtualized environment of the computer system of FIG. 2, the application or applications 1 and the virtualized storage system 2 are modified to use a network communication protocol and no longer a Fibre Channel communication protocol.

The computer system comprises an application part 1 and a storage part 2 which communicate via a TCP/IP protocol comprising two levels which are an IP network connection 4 over which the stored data flows and a high level TCP command connection 5 located above connection 4.

The application part 1 running on a virtual machine comprises a stack of several layers 10 to 13: layer 12 (for example "Api Tape") being above layer 13 (for example "Windows Socket") and comprising an application interface 15 (for example "New Interface Socket"), layer 11 (for example "V7000 DIITape") being above layer 12, layer 10 (for example "GCOS") being above layer 11. The virtualized storage part 2 comprises a stack of several layers 21 to 23: layer 22 (for example managing the SCSI commands) being above layer 23 (for example "AIX") and comprising a storage interface 25 (for example "New Interface Socket"), layer 21 (for example "Virtuo Engine") being above layer 22. Layer 13 of the application part 1 communicates with layer 23 of the virtualized storage part 2 by the connection 4 through which the stored data and the data to be stored travel, connection 5 enabling the exchange of high-level commands between the application 15 and storage 25 interfaces. It is these interfaces, application interface 15 and storage interface 25, which allow encapsulating and decapsulating the SCSI commands in IP packets transparent to the visualization hypervisor.

Layer 10 represents an example of a proprietary operating system, GCOS7. It allows running one or more critical and secure applications 1, written mainly in the COBOL programming language. The GCOS7 system runs on a V7000 virtual machine ("Virtualized 7000") represented by layer 11, which in turn runs on a "Microsoft Windows" (registered trademark) system represented by layers 12 and 13. The V7000 virtual machine emulates the firmware of GCOS7 platforms on Windows (registered trademark). The V7000 virtual machine implements all assembly instructions of the GCOS7 operating system, including multiprocess support, I/O scheduling, system administration, and communication mechanisms on an Intel (trademark) architecture.

The application 1 is a product based on virtualization of the GCOS7 architecture composed of the "Microsoft Windows Server" (registered trademark) system of the V7000 virtual machine and the GCOS7 operating system. It is therefore a virtualized application that comes in the form of a virtual machine running on the "VMware" virtualization hypervisor.

The application or applications 1 running in GCOS7 have the ability to write to tapes that are managed by the Virtuo engine represented by layer 21. The Virtuo engine is a virtualized storage system that includes a server, a disk array, and software able to emulate tapes in this disk space. The Virtuo engine runs on an AIX device represented by layer 23. Layer 22 represents a SCSI command system.

A new TCP/IP communication is performed on connections 4 and 5, replacing connection 3. For the application 1, the new TCP/IP protocol is implemented in the V7000 virtual machine. It is transparent to the applications 1 and the GCOS7 operating system. As for the virtualized storage system 2, the new protocol based on TCP/IP is implemented in a software module upstream of the other modules of the virtualized storage system 2 in order to limit the impact on the Virtuo engine.

In the case of FIG. 1, on the fiber channel connection 3, the communication was based on a "Fibre Channel Target Adapter" PCI type of AIX device, attached to a physical Emulex HBA card. In the case of FIG. 2, on connections 4 and 5 with the TCP/IP protocol, communication is based on a "Standard Ethernet Network Interface" type of AIX device attached to a network card.

The path for data travels through the TCP/IP communication on connections 4 and 5. The path for commands to manage tape mount and unmount requests remains unchanged. Management of these commands is performed by ACSLS emulation ("Automated Cartridge System Library Software") which is "Oracle Storage Tek" storage server software.

Of course, the invention is not limited to the examples or to the embodiment described and represented, but can have numerous variants accessible to those skilled in the art.

The invention claimed is:

1. A method for storing data of an application running on a virtual machine managed by a virtualization hypervisor, in a virtualized storage system corresponding to the emulation of at least one magnetic tape and at least one associated magnetic tape drive at least partially unsupported and incompatible by the virtualization hypervisor, said virtualized storage system being neither real magnetic tape nor real magnetic tape drive, said virtualized storage system providing for a sequential data access for reads and writes, via a network-level data exchange protocol which is not dedicated to data storage and which is supported by the virtualization hypervisor, said data exchange protocol performing an encapsulation of commands, incompatible and unsupported by the virtualization hypervisor, from the virtualized storage device so as to render the commands transparent for the virtualization hypervisor which, as it no longer sees incompatible characteristic of the virtualized storage device, will completely accept supporting the incompatible commands, without obstruction of the commands from the virtualization hypervisor, bypassing the incompatibility between the virtualization hypervisor and the virtualized storage device.

2. The storage method according to claim 1, wherein the network-level data exchange protocol is TCP/IP.

3. The storage method according to claim 2, wherein the TCP/IP communication protocol simulates SCSI commands and their responses.

4. The storage method according to claim 1, wherein the emulated storage device listens for queries of the application or applications at a socket defined by the association of an IP address and a port number.

5. The storage method according to claim 1, wherein the application is a secure critical application requiring dynamic backup.

6. The storage method according to claim 1, wherein the management of the storage device Which is itself emulated is carried out using a communication protocol which is different from the network-level data exchange protocol and is not dedicated to data storage.

7. The storage method according to claim 1, wherein the virtual machine is based on virtualization of a proprietary operating system.

8. The storage method according to claim 1, wherein the virtualization hypervisor is a VMware virtualization hypervisor.

9. The storage method according to claim 8, wherein an engine of the virtualized storage system runs on an AIX platform.

10. A virtual machine managed by a virtualization hypervisor, comprising a machine interface coded to send data storage commands from an application running on this virtual machine and to receive responses, incompatible and unsupported by the virtualization hypervisor, to these commands, from a virtualized storage system corresponding to the emulation of at least one storage device at least partially unsupported and incompatible by the virtualization hypervisor, said virtualized storage system being neither real magnetic tape nor real magnetic tape drive, said virtualized storage system providing for a sequential data access for reads and writes, via a network-level data exchange protocol which is not dedicated to data storage and which is supported by the virtualization hypervisor, said data exchange protocol performing an encapsulation of the virtualized storage device so as to render it transparent for the virtualization hypervisor which, as it no longer sees incompatible characteristic of the storage device, will completely accept supporting the incompatible responses from the virtualized storage system, without obstruction of the responses from the virtualization hypervisor, bypassing the incompatibility between the virtualization hypervisor and the virtualized storage device, and said virtual machine being implemented in and run on a physical machine.

11. A virtual machine comprising a machine interface coded to send data storage commands from an application running on this virtual machine and to receive responses, incompatible and unsupported by a virtualization hypervisor, to these commands from an emulation of at least one magnetic tape and at, least one associated magnetic tape drive, via a network-level data exchange protocol which is TCP/IP, said virtual machine being implemented in and run on a physical machine, said emulation being neither real magnetic tape nor real magnetic tape drive, said virtualized storage system providing for a sequential data access for reads and writes, said data exchange protocol performing an encapsulation of the responses to the commands as to render the incompatible responses transparent and supported by the virtualization hypervisor that manages the virtual machine, without obstruction of the responses from the virtualization hypervisor, bypassing an incompatibility between the virtualization hypervisor and the virtualized storage system.

12. A virtualized storage system corresponding to the emulation of at least one storage device at least partially unsupported and incompatible by a virtualization hypervisor, comprising a storage interface coded to receive data storage commands from an application running on a virtual machine managed by this virtualization hypervisor and to send responses, unsupported and incompatible by the virtualization hypervisor, to these commands, via a network-level data exchange protocol which is not dedicated to data storage and which is supported by this virtualization hypervisor, said data exchange protocol performing an encapsulation of the virtualized storage system so as to render the responses transparent for the virtualization hypervisor which, as it no longer sees incompatible characteristic of the storage system, will completely accept supporting the incompatible responses, without obstruction of the responses from the virtualization hypervisor, bypassing the incompatibility between the virtualization hypervisor and the virtualized storage system, and said virtual system being implemented in and run on a physical machine, said virtualized storage system being neither real magnetic tape nor real magnetic tape drive, said virtualized storage system providing for a sequential data access for reads and writes.

13. The virtualized storage system according to claim 12, wherein it comprises a server associated with a disk array and software for emulating, in the disk space of the disk array, at least one virtual magnetic tape and in at least one associated virtual magnetic tape drive.

14. The virtualized storage system according to claim 13, wherein the virtual magnetic tape drive is an HP LTO5 drive.

15. A virtualized storage system corresponding to the emulation of at least one magnetic tape and at least one associated magnetic tape drive, not supported nor compatible by a virtualization hypervisor, comprising a storage interface coded to receive data storage commands from an application running on a virtual machine managed by this virtualization hypervisor and to send responses, unsupported and incompatible, by the virtualization hypervisor, to these commands, via a network-level data exchange protocol which is TCP/IP, said data exchange protocol performing an encapsulation of the virtualized storage system so as to render the responses transparent for the virtualization hypervisor which, as it no longer sees incompatible characteristic of the storage system, will completely accept supporting the incompatible responses, without obstruction of the responses from the virtualization hypervisor, bypassing the incompatibility between the virtualization hypervisor and virtualized storage device, and said virtual system being implemented in and run on a physical machine, said virtualized storage system being neither real magnetic tape nor real magnetic tape drive, said virtualized storage system providing for a sequential data access for reads and writes.

* * * * *